United States Patent [19]

Mazzola

[11] Patent Number: 5,278,834
[45] Date of Patent: Jan. 11, 1994

[54] METHOD FOR IMPLEMENTING A DATA COMMUNICATION PROTOCOL STACK

[75] Inventor: Anthony J. Mazzola, Plano, Tex.

[73] Assignee: Alcatel Network Systems, Inc., Richardson, Tex.

[21] Appl. No.: 888,953

[22] Filed: May 26, 1992

[51] Int. Cl.$^5$ ............................................. G06F 13/00
[52] U.S. Cl. .................................. 370/94.1; 395/325; 395/725
[58] Field of Search ..................... 370/60, 85.1, 85.13, 370/94.1, 94.3, 110.1; 395/325, 375, 425, 700, 725; 364/200, 900

[56] References Cited

U.S. PATENT DOCUMENTS

| | | | |
|---|---|---|---|
| 4,941,089 | 7/1990 | Fischer | 370/94.1 |
| 4,991,133 | 2/1991 | Davis et al. | 395/725 |
| 5,007,051 | 4/1991 | Dolkas et al. | 370/85.1 |

Primary Examiner—Douglas W. Olms
Assistant Examiner—Alpus H. Hsu
Attorney, Agent, or Firm—Bruce C. Lutz; Dennis O. Kraft

[57] ABSTRACT

A system of managing memory used by communications tasks of a communications network operating with a multilayered communications protocol. Specially formatted buffers are used to contain data to be passed down the protocol stack of a source node, across a communications link, and up the protocol stack of a destination node. Before entering the source stack, message data is presegmented so that each buffer contains only so much message data as may be transmitted as a single data unit from source to destination, even after all layers of the source stack have added layer headers to that portion. Then, when the buffers are being passed within the source stack, any layer may segment the message data by simply unlinking buffers and adding its layer header to each segment. Inter-layer data passing is by means of exclusive access to buffers by one layer at a time. At the source stack, any layer that must send multiple copies of the message data may checkpoint the buffers and thereby regain the same buffers. At the destination stack, the buffers may be reassembled by relinking them.

6 Claims, 3 Drawing Sheets

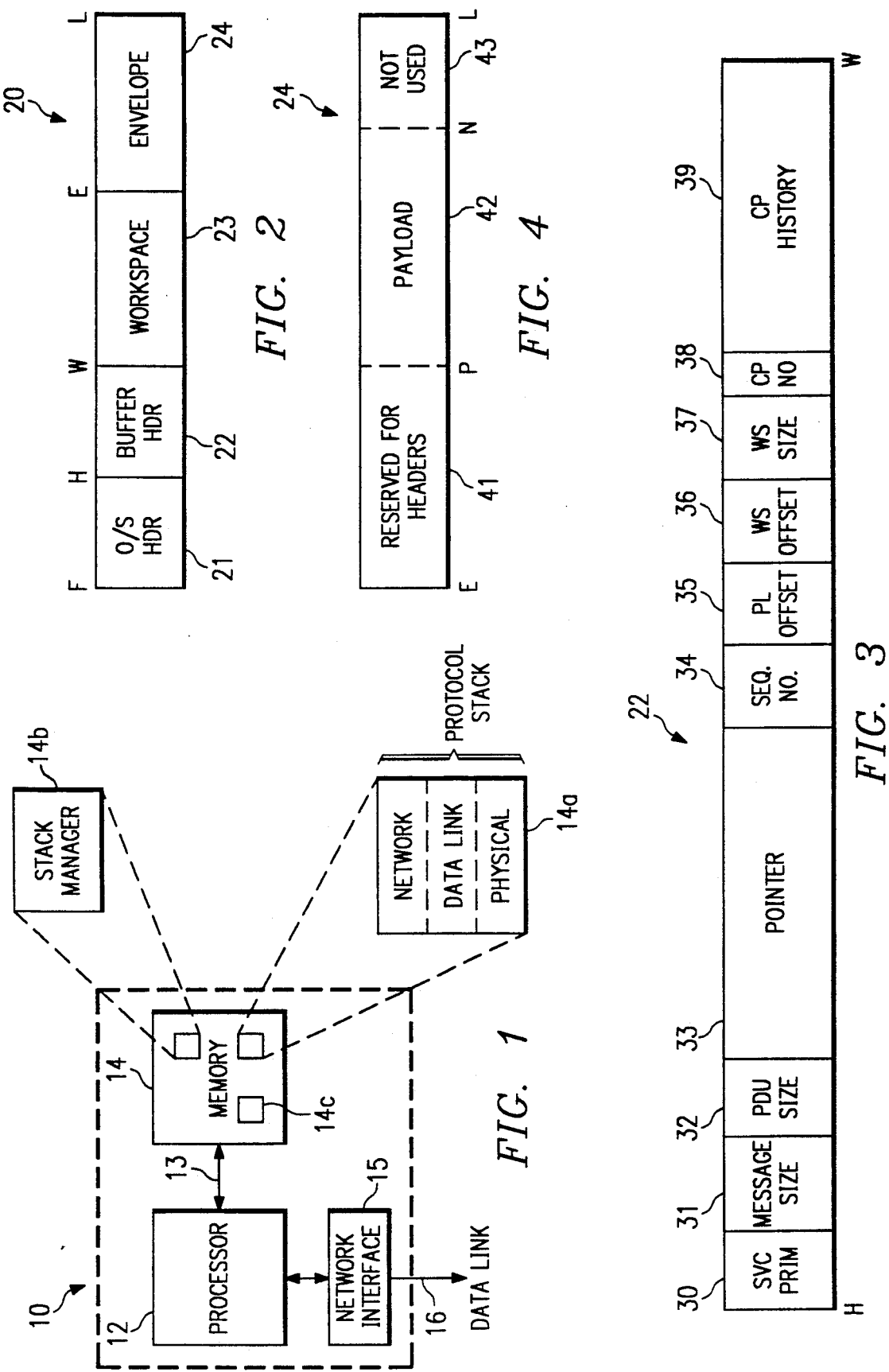

METHOD FOR IMPLEMENTING A DATA COMMUNICATION PROTOCOL STACK

TECHNICAL FIELD OF THE INVENTION

This invention relates to digital data communications, and more particularly to using a processor of an end system to manage data used by multiple protocol layers. Even more particularly, the invention relates to a memory management scheme for segmenting and passing data between the protocol layers.

BACKGROUND OF THE INVENTION

In the field of data communications, a general definition of a "protocol" is a set of rules governing the exchange of messages between two or more communication devices. Ultimately, communications are between "end systems" in the sense that each end system is either a source or destination, or both, of information. Typically, the end systems are processor-based devices, such as computer workstations.

The use of standardized protocols permits different end systems to communicate even if they are from different manufacturers, or for some other reason have different designs. Communications tasks conforming to the protocols are performed by various processors, controllers, and other "intelligent" devices in the network.

The seven-layer Open System Interconnection (OSI) is a protocol model, developed by the International Standards Organization. Although there are protocol models other than the OSI model, and not all data communications tasks involve all layers of the OSI model, it can theoretically be used to define all aspects of data communications.

Each layer of a protocol, such as the OSI protocol, is a set of tasks to be performed by some sort of intelligent entity, whether in the form of hardware, firmware, or software. In the OSI model, the top three layers (application layer, presentation layer, and session layer) are specific to the users of the information services of the network. The middle layer (transport layer), maintains a communication channel and is a liaison between network service users and the network service providers. The lower three layers (network layer, data link layer, and physical layer) deal with the actual network providing the network services.

In this layered approach to communication protocols, communications may be "horizontal" or "vertical". Horizontal communications are those to "peer" entities of other end-systems. Vertical communications are those between adjacent layers of the same end system.

From a functional viewpoint, an end-system of a communications network can be thought of as a "stack" of protocol layers, residing in and managed by the end system's intelligent devices. On the sending end, user data are generated at the higher layers. Each layer receives a protocol data unit (PDU) from the layer above, which contains the user data and any header data added by prior layers. The layer adds its own control information as a header. At the bottom of the source node's stack, the physical layer transmits the PDU over a data link. The PDU then moves up the stack of the destination node, where at each layer, a peer layer strips off its header to invoke one or more protocol functions.

Implementation of the protocol stack requires some sort of stack management scheme for passing PDU's from layer to layer. Typically, an area of memory, generally referred to as a "buffer" is used to contain all or part of each PDU. An example of an existing stack management method for passing data is based on a first-in first-out queue. Data are contained in a buffer that contains the queue. Each layer uses its own buffer and data is copied from one buffer to another. However, every copying step requires additional processing overhead. The copying of data from one buffer to another is particularly burdensome when a protocol function requires a layer to send multiple copies of a PDU.

In addition to the problem of the overhead required for buffer copying, another problem with existing stack management schemes is the need to implement PDU segmentation. Typically, segmentation requires data to be copied from one size buffer to another, or to be handled as linked lists, which then requires special hardware support.

A need exists for a method of managing a protocol stack that minimizes processing overhead without requiring special hardware. Thus, an object of the invention is a protocol stack management system that avoids the need for physical copying of buffers. Before entering the protocol stack, message data is converted to a special buffer format. An envelope portion of the buffer contains at least a portion of the message, and is sufficiently small that it may contain a PDU to be sent out from the lowest layer of the protocol stack even after all layers have added their headers. A buffer header portion of the buffer contains data for managing sequencing and copying of the buffers. The buffers are passed from layer to layer by means of exclusive access to them, whereby the same memory is accessed by only one layer at a time.

In this manner, message data is "pre-segmented" into buffers. The buffers are passed from layer to layer, as a linked list representing a PDU, without copying. Any layer may segment the PDU by unlinking the buffers and adding its layer header to each buffer envelope, thereby creating multiple PDU's, one in each buffer. A peer layer of the segmenting layer uses data in the buffer to reassemble the PDU. If a layer of the source stack needs to re-send a buffer or otherwise use multiple copies, that layer may "checkpoint" the buffer so that the layer will regain the same buffer. At the destination stack, the PDU's may be reassembled by linking buffers, and the original message may be reconstructed.

An advantage of the stack management system of the invention is that it is faster than systems that require physical copies from layer to layer within an end system. It solves the problem of handling blocks of message data that are larger than the PDU that can be handled by any one layer, without extra processing overhead or special hardware.

BRIEF DESCRIPTION OF THE DRAWINGS

FIG. 1 is a block diagram of an end-system processing unit.

FIG. 2 illustrates the format of a buffer used to implement the stack management method of the invention.

FIG. 3 illustrates the format of the buffer header field of the buffer of FIG. 2.

FIG. 4 illustrates the format of the envelope field of the buffer of FIG. 2.

DETAILED DESCRIPTION OF THE INVENTION

System Overview

Figure 5A:
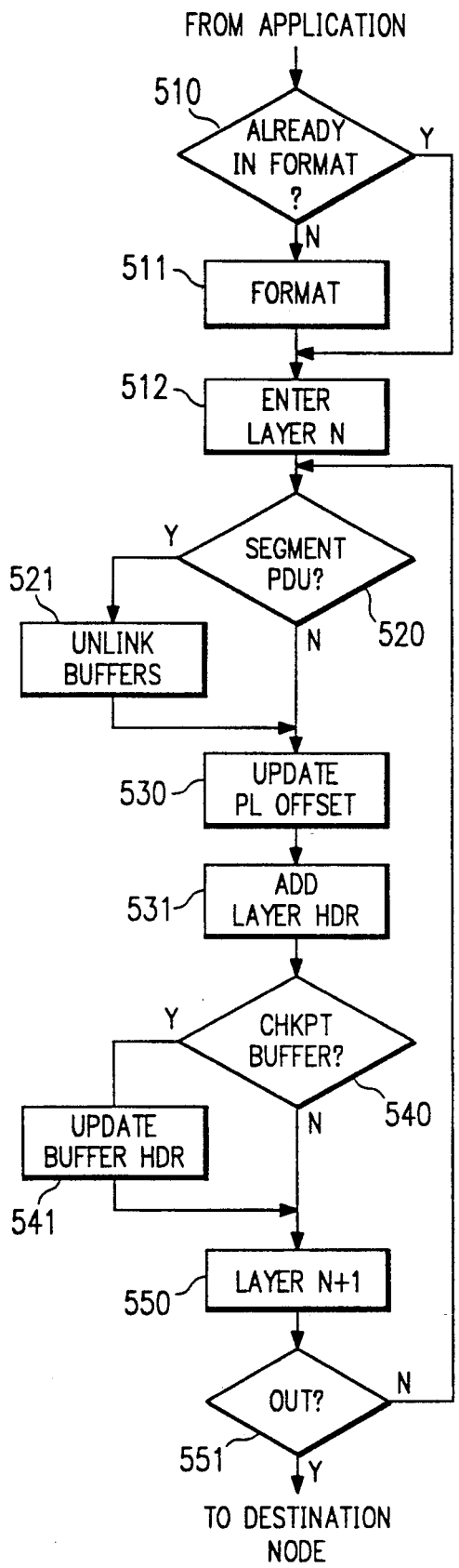
FIG. 5A illustrates the formatting, segmenting and checkpointing aspects of the invention at the source node.

FIG. 1 is a block diagram of an end-system processing node 10 of a digital communications network having other end system nodes 10. Each end system node 10 has a processor 12 in communication with a memory 14 and a network interface 15. End-system processing node 10 is described as an "end system" node because it may be a source node or destination node, or both, of digital data embodying useful information.

Processor 12 may be a general processor or a dedicated data communications processor, but in either case, has access to programming stored in memory 14 for handling data communications tasks. Memory 14 is a conventional digital storage memory for storing program code, as well as message data. Processor 12 and memory 14 communicate via an internal bus 13.

Processor 12 is in communication with at least one other end-system node 10 via a network interface 15 and a communications link 16. The network interface typically includes some sort of controller for handling access to and from communications link 16. In the example of this description, the communication link 16 is a bus connecting other nodes of a local area network. However, the invention could be used with any packet-based being that data is formatted into protocol data units (PDU's), which are handled by intelligent sending, receiving, and switching nodes that follow some sort of multi-layered communications protocol.

For carrying out its communications tasks, memory 14 stores a stack of protocol layers 14a, with each layer representing the various tasks designated by the protocol. Memory 14 also has programming for a stack manager 14b, which is executed by processor 12 and which handles interlayer communications by means of message buffers in accordance with the invention. A third area of memory 14 is a buffer pool 14c, from which message buffers, each having in a format in accordance with the invention, are allocated.

In the example of this description, stack 14a has three layers: a network layer, a data link layer, and a physical layer. Consistent with conventional usage, the term "layer" is sometimes used herein to refer to the tasks performed at that layer. The invention could be used with another protocol stack 14a having more layers and/or different layers. However, as explained below, the network layer is preferred for providing the functions to implement certain aspects of the invention.

Stack 14a, as with other protocol stacks, permits data to be passed Vertically between adjacent protocol layers. Within each layer, a task handles the data at some appropriate time. The programming task identifies the data by means of protocol control information, which has been added in the form of a header. The combination of user data and control data are referred to herein as the protocol data unit (PDU). When data is being sent from an end-system node 10, the PDU is passed "down" the stack and additional control information is added at each layer; at the receiving end system node, the PDU is passed "up" the stack where each layer strips the control information it needs.

As an overview of the invention, it is a method of implementing a protocol stack to avoid physical copying of data, i.e., copying from one memory location to another. The invention uses a special data structure, a memory buffer, into which message data is formatted before reaching the protocol stack. The buffer contains at least part of the message data, and which is large enough to contain this portion, as well as headers from all protocol layers of the source stack. A block of message data that is too large to be transmitted as a single data unit through the physical layer may be pre-segmented into multiple buffers, as a linked list of buffers representing an unsegmented PDU. Because this PDU is already formatted into buffers having a size that is small enough for purposes of transmission at the physical layer, subsequent segmentation of this PDU by a protocol layer involves merely unlinking the list and adding a layer header to each buffer of the unlinked list. For passing buffers between layers, the layer whose tasks are currently being performed obtains exclusive access to the buffers. A task at any one layer may also "checkpoint" a buffer, so that the task may re-gain the buffer in the state used by that layer.

More specifically, for the segmentation aspect of the invention, the buffer's envelope field contains headers of all protocol layers, plus a certain amount of user data. In all, the envelope field is defined to hold only as much data as the largest PDU that can be handled by the physical layer. Thus, if a message data will exceed the size of the envelope field after all layer headers are added, the data is segmented into multiple buffers, with the amount of data determining how many buffers are needed. Each buffer has space for all protocol layer headers, as well as a buffer header that contains data for use in buffer management. The message data is thereby segmented into a linked list of buffers. This linked list is passed to a layer as a PDU, which the layer may then segment by unlinking the list and adding a layer header to the envelope field of each buffer. The segmenting layer and all subsequent layers of the source stack and the destination stack may deal with the segmented PDU's, each in its own buffer, as separate units without the need for copying or linking. At the destination node, a peer entity reassembles the segmented PDU's to create another linked list.

The checkpointing aspect of the invention may occur at any layer of the source node. Each layer accesses the buffer at its appropriate time. If the layer's functions include sending out more than one copy of the PDU, it may request the buffer to be checkpointed. Checkpointing is based on the assumption that headers of a PDU grow from right to left. Thus, at any one layer, the data to the right of a certain point will not change as the data moves down the stack. Checkpointing is implemented by storing information about the current contents of the buffer so that the checkpointing task may re-access the same buffer. The result is that each access, whether by a first or second next lower layer or by the sending layer, is serialized. The sending layer re-gains the same buffer it had before.

The above-described stack management tasks are carried out as part of the programming of stack manager 14b. This programming may be implemented in any number of known software architectures. Typically, stack manager 14b functions will be performed by procedures called at the appropriate layer.

Buffer Format

FIG. 2 illustrates the format of a single buffer 20, formatted in accordance with the invention. Each buffer 20 has four main fields: a operating system header field 21, a buffer header field 22, a workspace field 23, and an envelope field 24. Fields 21-24 begin at memory locations represented as F, H, W, and E, respectively, with the last field ending at location L.

The operating system header field 21 contains data used for buffer management by the operating system of processor 12. An example of the type of data in this field is the identity of the buffer pool 14c from which buffer 20 was allocated.

The buffer header field 22 contains data used by the stack manager for buffer management. The buffer header field 22 is described in further detail in connection with FIG. 3.

The workspace field 23 contains memory used by any protocol layer as part of the checkpointing aspect of the invention. In general, workspace field 23 permits a protocol layer to save status data specific to a particular buffer 20 without the need for access to additional space in memory 12.

The envelope field 24 contains the protocol data unit (PDU) 20, which is the user and control data that is to be exchanged between protocol layers. As explained above, this PDU may be the result of presegmentation into a buffer list and of segmentation into an unlinked buffer. The size of envelope 24 permits each layer to add its header data, and thereby expand the size of the PDU. Yet, only so much message data is placed in the envelope field 24 as will be capable of being transmitted at the physical level. The PDU "grows" to the left, so that as it grows, a space of unfilled bits from the beginning of the envelope field 24 to the beginning of the PDU becomes smaller. Envelope field 24 is described in further detail in connection with FIG. 4.

FIG. 3 illustrates the contents of the buffer header field 22. It has ten subfields 30-39, each associated with a specific type of information. The data stored in these subfields is referred to herein collectively as the "buffer header data".

The service primitive subfield 30 specifies the service that is being requested from a layer, whose message is being passed to buffer 20. The contents of this field 30 correspond to the service primitives defined by various standards, such as the OSI service primitives, which are well known in the art of data communications.

The message length subfield 31 contains a value representing the size of the message to be transmitted 20. As explained below, a decision is made before the message reaches the source stack, whether the message, if treated as a single PDU, will grow too large to fit into the envelope field 24 of a single buffer 20. If so, it is segmented among multiple buffers 20. If buffers 20 are so pre-segmented, the message length subfield 31 stores the total size of all message segments to be transmitted to a destination node.

The buffer size field 32 contains a value representing the size of the PDU that is being stored in that buffer 20. If the message has been pre-segmented, the buffer length field 32 represents the size of the PDU segment in that buffer 20.

The next-buffer pointer subfield 33 contains the address of the next buffer 20 if a PDU is part of a linked list. The value in this subfield 33 is null if segmentation is not required or if the linked list has been unlinked.

The sequence number subfield 34 contains the sequence number of a buffer 20 that is or was part of a linked list of buffers. This subfield 34 is used by the stack manager 14b to permit buffers 20 to be reassembled in the correct order. Although buffer header 22 does not travel between the source and the destination nodes, at the destination node, data supplied by a layer in its layer header may be used to regenerate sequence numbers.

The payload offset subfield 35 contains an offset value into the envelope field 24, which identifies the beginning of the payload. This offset value is relative to the beginning of the envelope field 24. Thus, for example, if the envelope field begins at location E, and the PDU begins at location P, the offset is E-P.

The workspace offset subfield 36 contains an offset value into the workspace that identifies where already reserved workspace begins. This offset value is relative to the start of the workspace field 23, i.e., location W.

The workspace size subfield 37 specifies the size of the workspace field 23.

The checkpoint number subfield 38 contains the number of times that buffer 20 has been logically copied by a protocol layer. If the value in this subfield 38 is zero, when a buffer 20 is released by a task, the buffer 20 is returned to buffer pool 14c. Otherwise, the buffer 20 is returned to the layer that made the last checkpoint, in its state at the time of the checkpointing, and the value in subfield 38 is decremented.

The checkpoint history subfield 39 contains data for implementing checkpointing. For example, if a segmented PDU has been checkpointed, the checkpoint history subfield 39 contains data for reassembling the PDU's.

FIG. 4 illustrates the envelope field 24 of a buffer 20. For purposes of example, the length of the field 24 is from location E to location L. Location P represents the beginning of the current payload, which includes any protocol headers that have been added by preceding layers of a source stack 14a, or not yet stripped by lower layers of a destination stack 14a. Locations E-P are used for layers of the source stack 14a to add their protocol layer headers. In this example, the next layer will add its header in front of the payload subfield 42, with the least significant bit at location P-1. The payload offset subfield 35 of the buffer header 22 of that buffer 20 will be updated to indicate a new value of P. Locations P-N contain the user data, which may become a PDU as a result of layer segmentation. It is initially placed at a predetermined location P, so that each layer can determine where to add its header in front. The unused portion beginning at location N will remain unused if the envelope field 24 is larger than the PDU with all headers when it reaches the bottom of the source stack 14a.

Operation of the Invention

Figure 5B:
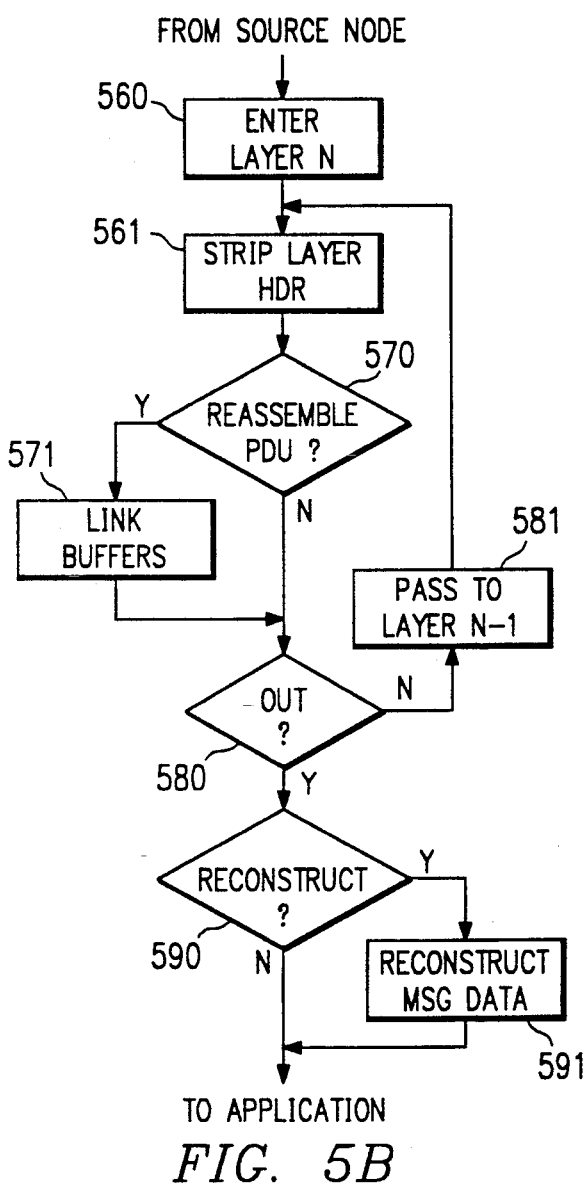
FIG. 5B illustrates the reassembly and reconstruction aspects of the invention at a destination node.

FIGS. 5A and 5B illustrate the method of the invention, as implemented with one or more buffers 20. The process of FIGS. 5A and 5B begins when an application being currently executed by processor 12 of a source end system 10 has a message to send to a destination end system 10. In a system that uses a multi-layer protocol, user data and control data are passed from layer to layer as PDU's which travel down the stack 14a of the source end system, and then travel up the stack 14a of the destination end system 10. The process at the source stack 14a is shown in FIG. 5A. The process at the destination stack 14a is shown in FIG. 5B. As a PDU travels down the source stack 14a, each layer adds header data. As PDU travels up the destination stack, each layer strips the header data added by its peer layer, eventually leaving the user data to be processed by the application layer.

Implementation of the protocol stack is by means of buffers 20, having the format described above in connection with FIGS. 2-4. Ideally, the application layer of the source node will use this same format for processing data. If not, at some point before the data enters the protocol stack, it is formatted into the buffers. Thus, step 510 of the process is determining whether the user data is already formatted into buffers 20.

If the data is not already formatted, step 511 is formatting the data into at least one buffer 20. Some variation of the format of FIGS. 2-4 could be used, so long as the buffer has at least a header field 22 with a means for updating a payload offset and buffer pointers, and an envelope field 24 for permitting a PDU to grow to some predetermined size limit as protocol layer headers are added.

Step 511 is the only step in the process of FIG. 5 that involves physical copying. Remaining steps involve passing exclusive access to a buffer 20 from layer to layer, as well as segmentation and check-pointing techniques, all of which avoid the need for copying.

For formatting, the size of the message data is compared to a predetermined maximum size limit of envelope field 24 to determine whether, once all protocol layer headers are added, the resulting PDU would be too large to send out from the source node as a single data unit. If so, portions of the message data are placed into the envelope fields 24 of two or more buffers 20. In each buffer 20, the data is placed at a predetermined bit position to the right of the beginning of the envelope field 24, such as at bit P of FIG. 4, so that the payload will have room to grow to the left within envelope field 24 as each successive layer adds its headers. In the buffer header field 22 of each buffer 20, message size, buffer size, and sequence number subfields 31, 32, and 34, respectively, are updated. At this point, buffers 20 are chained as a linked list. Each pointer subfield 33, except for that of the last buffer in the list, contains a pointer to the next buffer 20.

In step 512, the linked list of buffers is presented to a first layer of the protocol stack as its PDU. As will be explained below, and as indicated by steps 520 and 540, each layer makes a decision whether or not to segment this linked list and whether or not to checkpoint the buffers 20. Although FIG. 5A shows segmentation occurring before checkpointing, this order is not necessary. The process of steps 520-550 is repeated for each layer of the stack. Thus, more than one layer and its peer may perform the segmentation/reassembly function. Also, more than one layer may checkpoint buffer(s) 20, resulting in "nested" buffers 20.

In step 520, the current layer determines whether the linked list of buffers 20 is too large to be handled as a PDU by that layer.

If so, step 521 is partly or completely separating the linked list, which means that pointer values in pointer subfield 33 are nulled. The result is subsets of linked buffers 20 or subsets of unlinked buffers. The subsets contain the entire block of user data but each subset is handled by the current layer, as well as by subsequent layers, as a separate unit.

In step 530, the current layer updates the payload offset subfield 35. This makes room in the envelope field 24 for the layer header.

In step 531, the current layer adds its header to the front of the PDU in the envelope field 24 of each buffer 20, causing the payload to grow to the left. This header contains data indicating whether the buffer 20 is part of a larger block that will require reassembly.

As a result of steps 520-531, a PDU in n buffers is now n PDU's in n buffers. In step 540, the current layer determines whether it may need to send more than one copy of the message. As an example, a layer task might make a routing decision that requires the PDU to be sent to more than one subnetwork layer of different end-systems. After checkpointing a buffer, the layer task releases it to a first sublayer. It later regains the same buffer and releases it to the next sublayer, etc. Each time a task gains access to the buffer, the task accesses only the data relevant to that layer In step 541, for checkpointing, each buffer header 22 is updated with the current size of the PDU and the amount of the PDU in each buffer 20. This data is stored in the PDU size subfield 31 and buffer size subfield 32 of each buffer 20. Thus, if the PDU has been segmented, the buffers 20 may be linked for re-use. The payload offset subfield 35 of each buffer 20 contains the location of the beginning of that buffer's payload so that the checkpointing task re-gains only the buffers 20 that it sent out. The data used to re-gain a checkpointed buffer 20 is referred to herein as the "checkpoint" data. When a layer checkpoints a buffer 20, it may also reserve a portion of workspace field 23, and specify how much space is to be reserved for "workspace" data.

It should be understood that any protocol layer may checkpoint buffer 20 if its functions call for multiple copies of the buffer. For example, certain layers guarantee delivery of a PDU, by re-transmitting the PDU if no acknowledgement is received. In this case, the sending layer would checkpoint buffer 20 so that it may re-gain access to the same PDU if necessary. When buffer 20 is released by the receiving layer to the buffer manager 14b and returned to the checkpointing layer, that layer accesses only so much of the buffer 20 as existed when the buffer 20 was first at that layer, i.e., the portion that was checkpointed.

In step 550, regardless of whether or not the PDU has been segmented or the buffer(s) 20 checkpointed, a logical copy of each buffer 20 is passed to the next lower layer. When a layer passes a buffer 20 to an adjacent layer, either up or down the stack, control over the buffer 20 is passed along with the buffer. Only the controlling layer may modify the buffer 20.

If the buffer 20 has reached the physical layer, in step 551, the message is transmitted to the destination node as a set of unlinked buffers 20, each containing a PDU. It is assumed that the data link and input port of the destination node accommodate the size of a single buffer 20. If the buffer is not at the bottom of the stack 14a, the next layer repeats steps 520-550.

In FIG. 5B, the buffers have been communicated to the stack 14a of the destination node.

In step 560, the buffers 20 are received separately at the lowest layer. In accordance with standard protocol operation, the layer strips its layer header data from each buffer 20.

In step 570, the layer then determines whether its functionality includes reassembly of the PDU that was previously segmented by a peer layer at the source node. For example, if layer n of the source node segmented a linked list of n buffers into two linked lists of n/2 buffers, its peer layer will reassemble the list of n buffers by relinking them. If so, the layer performs step 571, which is linking the buffers to form a linked list, which represents a reassembled PDU. Data stored in the layer header is used for reassembly.

As in FIG. 5A, as indicated by steps 580 and 581, the reassembly steps 570 and 571 can occur at more than one layer.

At the highest layer of the destination stack 14a, the layer determines whether the application uses the same buffer format as is used to implement the invention. If not, step 591 is reconstructing the message data from the linked list of buffers into the form it had before entering the stack at the source node.

Figure 6A:
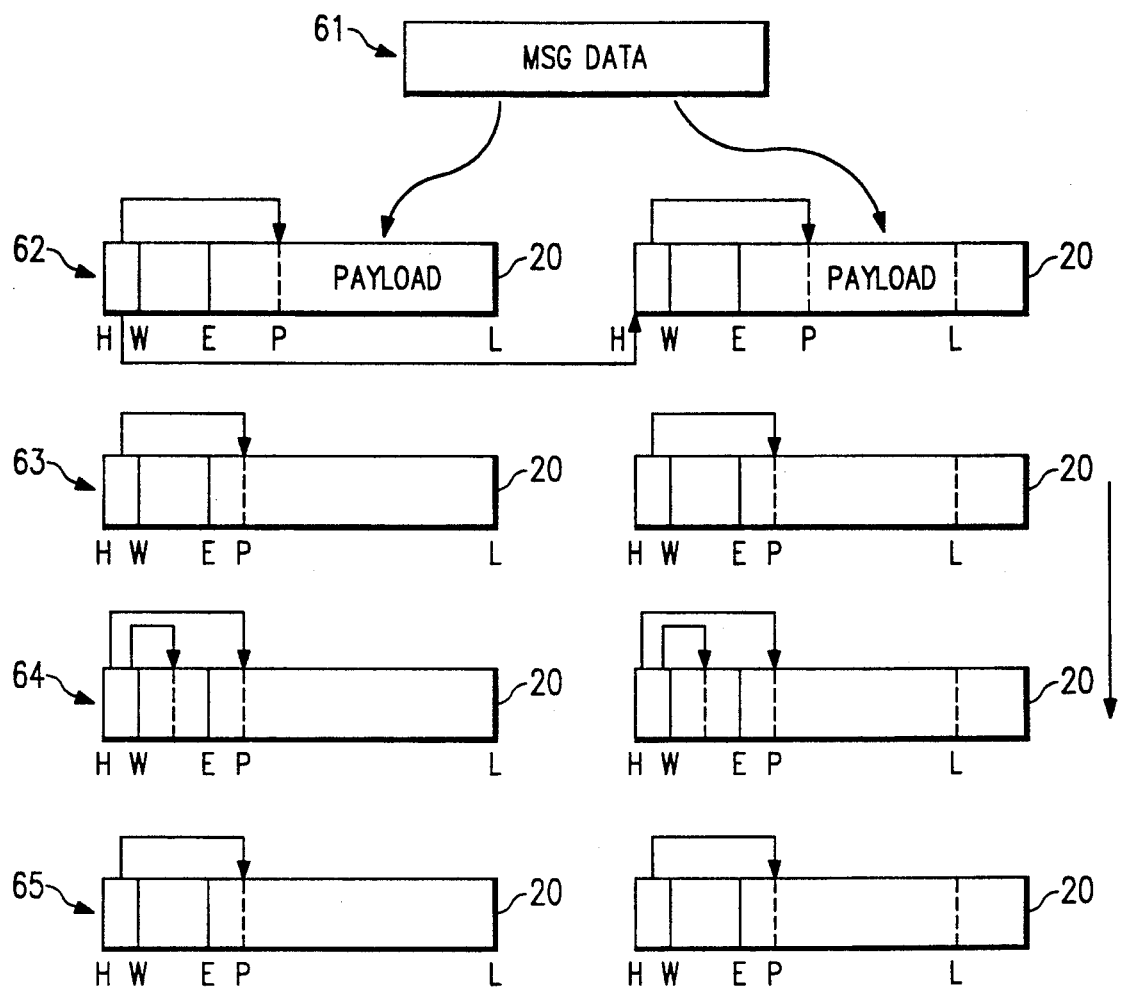
FIG. 6A illustrates the change in the contents of segmented and checkpointed buffers at the source stack.
Figure 6B:
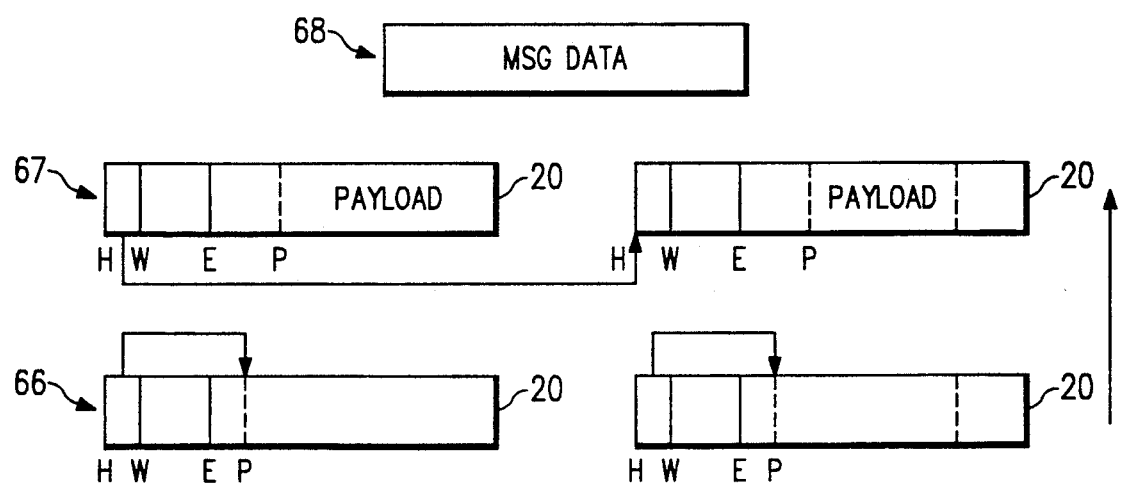
FIG. 6B illustrates the change in the contents of buffers as they are reassembled at the destination stack.

FIGS. 6A and 6B illustrate an example of the buffer format for a message, as it progresses down, then up, the protocol stacks 14a of a source and a destination end system. More specifically, FIG. 6A illustrates how a block of message data 61 to be transmitted over a network is pre-segmented into two buffers 20, and how the contents of the buffers 20 change as they are segmented and checkpointed at of the source end system; FIG. 6B illustrates buffers 20 as they are reassembled and reconstructed at the destination end system.

FIGS. 5A and 5B and FIGS. 6A and 6B, are related in that certain steps of FIGS. 5A and 5B result in certain changes to buffers 20. These are referred to as "phases". For purposes of example, it is assumed that both segmentation and checkpointing occur at the same layer. It should be understood that FIGS. 6A and 6B do not show separate protocol layers.

For purposes of this description, the block of message data 61 is assumed to be sufficiently large to require presegmentation into more than one buffer 20. Also, it is assumed that task of a layer is required to provide multiple deliveries, such that the layer uses the checkpointing feature of the invention to avoid multiple copies.

In phase 61, the message appears as a single block of user data.

In phase 62, the message data has been divided into two parts, each of which is copied into envelope field 24 of a buffer 20. In accordance with step 520 of FIG. 5, in each buffer 20, the user data is placed at a predetermined bit position, such as at bit P. As in FIG. 2, in each buffer 20, bits H–W represent the header field 21, bits W–E represent the workspace field 23, and bits E–L represent the envelope field 24. The OS header field 21 is not shown. At this point, the buffers 20 are chained as a linked list. In phase 63, the layer has segmented the message by separating the linked list. In accordance with step 530, the payload offset subfield is updated to point to the new location of P. The layer adds its layer header in accordance with step 531, causing the size of the payload to grow to the left.

In phase 64, the layer has checkpointed buffers 20 in accordance with step 541. The data in buffer header 22 has been updated so that the existing state of buffers 20 may be re-accessed. As part of the checkpointing step, the an area of workspace field 23 is reserved to track the identity of the sublayers to which the buffers 20 have already been sent. The value in the workspace offset subfield 36 points to the beginning of the unreserved workspace.

In phase 65, the buffers 20 have been received, transmitted, and released, by the physical layer of the protocol stack 14a. Transmission has occurred with each buffer 20 being treated as a separate data unit. The buffers 20 have been handed back to the checkpointing layer, which has released the reserved portion of workspace field 23. Although other layers below the checkpointing layer have added their protocol headers, and thus expanded the size of the payload, each buffer header 22 contains data that permits the checkpointing layer to regain each buffer 20 in its state when sent out.

Referring now to FIG. 6B, the changes in buffers 20 at the destination end system are shown. As in FIG. 6A, not all activities at all layers are shown; only those relevant to effect of reassembly on the contents of buffers 20 are shown.

In phase 66, the buffers 20 are received at the destination node via the lowest protocol layer. The buffers 20 are received separately. The envelope fields 22 appear as they did at the peer layer of the source stack 14a.

In phase 67, a peer layer of the segmenting layer reassembles the PDU's and removes its own layer headers. It uses reassembly data in its layer header to determine how to reassemble. The format of the buffers 20 is now identical to that of phase 62, when they were first passed to the segmenting layer of the source node. The buffers 20 again appear as a linked list, such that the pointer subfield 33 contains a pointer to the second buffer 20.

In phase 68, the message data is reconstructed from the linked list of phase 67. As with step 61, this step may be skipped if the application layer uses the buffer format of FIG. 2 directly.

As a summary of the invention, message data is formatted into a linked list of buffers 20 having an envelope field with a predetermined size limit that ensures that each buffer 20 will contain only as much PDU data as can be transmitted at the physical layer. In other words, the portion of the message data allocated to a buffer becomes that buffer's PDU, and is stored in an envelope field having enough room for the addition of headers at each layer of the stack. Because the message data is formatted in this manner, subsequent segmentation by any layer requires only separation of the linked list and addition of a layer header to each buffer 20. Segmentation and reassembly may be performed at any layer. The PDU's, in separate buffers 20, are transmitted as single data units, and reassembled by a peer entity of the segmenting layer. The checkpointing aspect of the invention provides a means for serializing the passing of a buffer to another protocol layer in a manner that permits the sending layer to reobtain the same buffer. The segmentation and checkpointing aspects of the invention may be combined such that a message can be checkpointed with respect to all buffers 20 that it uses.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of implementing source and destination protocol stacks for a multi-layered communications protocol system that generates message data during execution of application layer tasks at a source node, comprising the steps of:

receiving a protocol data unit into a communications protocol stack of a source node in the form of a linked list of data communications buffers, each buffer having an envelope field for storing said message data and layer headers and a buffer header field for storing buffer data to be used for segmenting and reassembling said protocol data unit, wherein said buffer has a size capable of being transmitted between a source and a destination protocol stack after all layer headers are stored in said envelope field at said source node;

passing access to said buffers to each next protocol layer of said source node, such that each layer gains exclusive access to said buffers;

segmenting said protocol data unit at any layer of said source node by unlinking all or some of said linked buffers;

unlinking any of said buffers that remain linked at the physical layer of said source node;

transmitting the unlinked buffers from said source node to a destination node;

receiving the unlinked buffers into a protocol stack of said destination node as separate data units; and reassembling said protocol data unit at the destination stack by re-linking said buffers.

2. A method of implementing source and destination protocol stacks for a multi-layered communications protocol system that generates message data during execution of application layer tasks at a source node, comprising the steps of:

receiving a protocol data unit into a protocol stack of a source node in the form of a linked list of data communications buffers, each buffer having an envelope field for storing said message data and layer headers and a buffer header field for storing buffer data to be used for segmenting and reassembling said protocol data unit, wherein said buffer has a size capable of being transmitted between a source and a destination protocol stack after all layer headers are stored in said envelope field at said source node;

passing access to said buffers to each layer of said source node, such that each layer gains exclusive access to said buffers;

at the physical layer of said source node, segmenting said protocol data unit by unlinking each of said buffers;

transmitting the unlinked buffers from said source node to a destination node;

receiving the unlinked buffers into a protocol stack of said destination node as separate data units; and reassembling said protocol data unit at the destination stack by re-linking said buffers, said reassembling step being performed at a peer layer of the layer at which said segmenting step was performed.

3. A method of communicating message data from a source node to a destination node of a communications network that follows a multi-layered communications protocol with the message data being generated during execution of an application layer at the source node, comprising the steps of:

formatting one or more data communications buffers, each buffer having an envelope field for storing portions of the message data and layer headers and a buffer header field for storing buffer data to be used for segmenting and reassembling said protocol data unit;

storing said message data in aid envelope field, wherein said buffer has a size such that said envelope contains only so much message data as can be transmitted between said source node and said destination node after all layers of said source node have added their layer headers to said message data;

receiving a linked list of said buffers as a protocol data unit into a protocol stack of said source node;

at any protocol layer of the source stack other than the physical layer, segmenting said protocol data unit by unlinking said buffers;

passing access to said buffers to each next layer of said source node, such that each layer gains exclusive access to said buffers;

at the physical layer of said source stack, unlinking each of said buffers, if not already unlinked, such that each of said buffers may be transmitted as a separate data unit;

transmitting the unlinked buffers from said source node to the destination node;

at the destination node, reassembling said protocol data unit by re-linking said buffers and;

reconstructing said message data from said portions of message data stored in said buffers.

4. A method of implementing source and destination protocol stacks for a multi-layered communications protocol system that generates message during execution of tasks at an application layer of a source node and that executes various communication tasks at other layers, comprising the steps of:

receiving a protocol data unit into a communications protocol stack of a source node in the form of a linked list of data communications buffers, each buffer having an envelope field for storing said message data and layer headers and a buffer header field for storing buffer data to be used for segmenting and reassembling said protocol data unit, wherein said buffer has a size capable of being transmitted between a source and a destination protocol stack after all layer headers are stored in said envelope field at said source node;

passing access to said buffers to each next layer of said source node, such that each layer gains exclusive access to said buffers;

segmenting said protocol data unit at any layer of said source node by unlinking some or all of the linked buffers;

at any layer of said source node, storing payload data in said buffer header field representing the state of the protocol data unit so that said any layer may regain access to said protocol data unit in the same state after performing said passing access step;

unlinking any of said buffers that remain linked at the physical layer of said source node;

transmitting the unlinked buffers from said source node to a destination node;

receiving the unlinked buffers into a protocol stack of said destination node as separate data units; and reassembling said protocol data unit at the destination stack by re-linking said buffers.

5. A method of using data communications buffers to implement a protocol stack of a source node of a communications network following a multi-layered communications protocol, such that message data is generated at an application layer of the source node such that no physical copying is required, comprising the steps of:

before entering the protocol stack, formatting a protocol data unit as a plurality of linked buffers, each buffer having an envelope field and a buffer header field for storing buffer data to be used for segmenting said protocol data unit at any layer, such that said envelope field contains at least a portion of said message data, wherein said portion is sufficiently small such that said buffer may be transmitted between a source node and a destination node as a complete data unit after all protocol layers have stored layer header data in said envelope;

passing said protocol data unit down said stack, from layer to layer of said stack, by granting each successive layer exclusive access to said protocol data unit;

during said passing step, using a pointer subfield of said buffer header field to unlink said buffers if said protocol data unit is too large for any layer of said protocol stack; and receiving said buffers at a physical layer of said protocol stack.

6. A method of using data communications buffers to implement a protocol stack of a source node of a communications network following a multi-layered communications protocol, such that message data is generated at an application layer of the source node such that no physical copying is required, comprising the steps of:

before entering the protocol stack, formatting a protocol data unit as a plurality of linked buffers, each buffer having an envelope field and a buffer header field for storing buffer data to be used for segmenting said protocol data unit at any layer, such that said envelope field contains at least a portion of said message data, wherein said portion is sufficiently small such that said buffer may be transmitted between a source node and a destination node as a complete data unit after all protocol layers have stored layer header data in said envelope;

passing said protocol data unit down said stack, from layer to layer of said stack, by granting each successive layer exclusive access to said protocol data unit; and at any one layer of said protocol stack, using a payload offset subfield of said buffer header to store data representing the state of said protocol data unit at said any one layer, such that said any one layer may pass said protocol data unit to another layer and subsequently regain access to said protocol data unit in said state.

* * * * *